Dec. 22, 1931. A. M. FARMER 1,837,811
MEASURING NIPPLE FOR LUBRICATING SYSTEMS
Filed Oct. 15, 1928
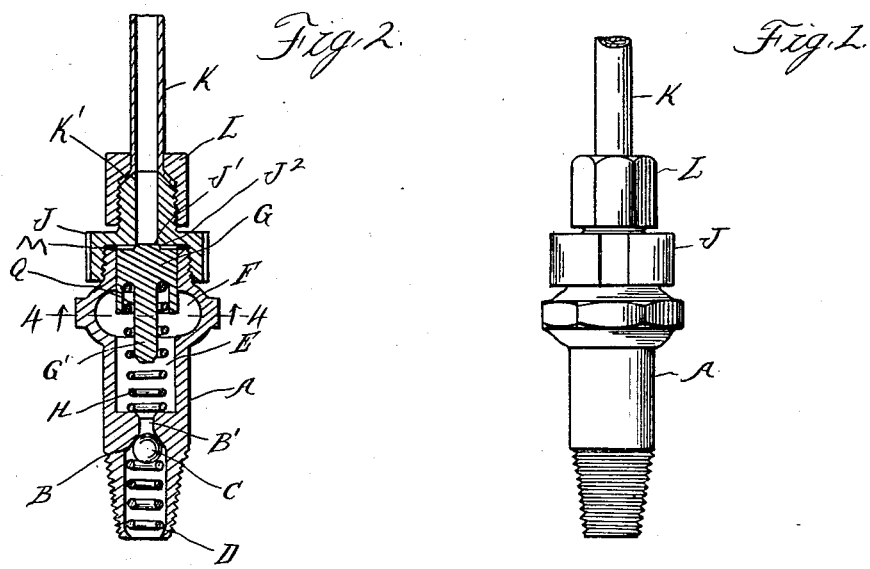
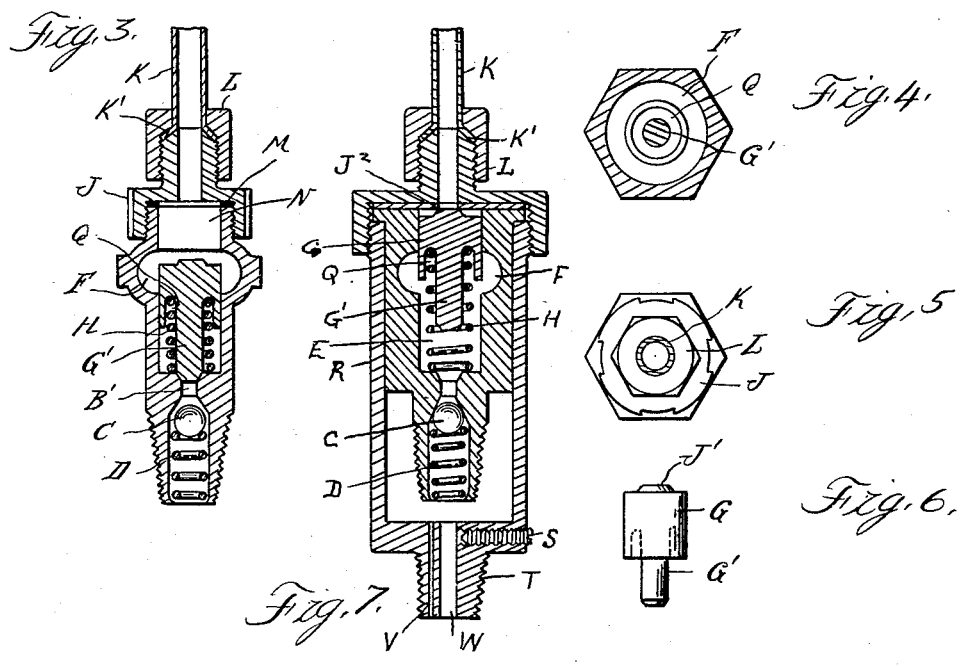
INVENTOR
Albert M. Farmer
BY
Swan Frye and Murray
ATTORNEYS Patented Dec. 22, 1931

1,837,811

UNITED STATES PATENT OFFICE

ALBERT M. FARMER, OF DETROIT, MICHIGAN, ASSIGNOR, BY MESNE ASSIGNMENTS, TO THE FARFALL COMPANY, OF DETROIT, MICHIGAN, A CORPORATION OF MICHIGAN

MEASURING NIPPLE FOR LUBRICATING SYSTEMS

Application filed October 15, 1928. Serial No. 312,579.

This invention relates to a measuring nipple for use as a controlling element or unit in a multiple lubricating system to which a measured quantity of lubricant is designed to be fed by the actuation of a single supply or control pump, and has for its object an improved organization of parts adapted to trap within its shell a measured quantity of lubricant, ready for forcing into the bearing of just that quantity and no more, regardless of the equality or otherwise of the pressure conditions prevailing through the supply system as a whole. Without such a device it has been my experience that the various lubricating systems now generally known are apt to unequally distribute the lubricant between the various bearings, some receiving an excess quantity and others an insufficient quantity.

In the drawings:

Figure 1 is an elevational view of my improved device.

Figure 2 is a sectional elevational view thereof with the parts in unactuated position.

Figure 3 is a similar sectional elevational view showing the parts after the nipple and its contents have been subjected to the pressure induced throughout the lubricating system by the manual actuation of a pump plunger or an equivalent medium.

Figure 4 is a cross sectional plan view taken along the line 4—4 of Figure 2 and looking in the direction of the arrows there shown.

Figure 5 is a plan view from above.

Figure 6 is an elevational view of the piston or plunger disassociated from the other parts.

Figure 7 is a sectional elevational view of a slightly modified form, wherein a shell or enclosing casing is permanently located about the operative parts, in place of the ball-valve-controlled outlet leading directly into a bearing or other part to be lubricated.

A indicates the suitably contoured and apertured shell of the nipple, which is provided near its lower end with a passage B' and a valve seat B, against which latter the ball C is normally and yieldingly held in position of closure with respect to the passage B' by means of the spring D. The chamber E within the body of the shell A is partly rounded or bulged as at F and partly cylindrical in shape, so as to constitute respectively an accumulating chamber and a bore or guide for the lengthwise movement of the piston or plunger G, which is normally held in raised position by the spring H, which is interposed between the annular air pocket Q in the bottom portion of the plunger G and that portion of the nipple shell immediately above the ball-valve-controlled passage B'. The upper neck portion of the interior of the shell A is formed as a cylindrical or closing guide for the piston when in raised position, and is crowned by a nut J which is preferably provided with a seat J' with which the top projection $J_2$ on the body of the valve piston engages. Connection with the feed pipe line K is had through the medium of the flanged and threaded collar L, which engages both the outwardly flanged end K' of the feed pipe K and the top threaded portion of the nut J. A washer M is preferably positioned between the top edge of the nipple body A and the adjacent under face of the threaded nut J.

The operation of this device is as follows: Upon the pump-actuated progress of a supply of a lubricant through the feed pipe K, the plunger or piston G is forced downwardly, so that the lubricant can enter the now open space N in the top of the shell A and proceed therefrom to the bulged or chambered portion F of the shell A. It will be noted from an examination of Figure 1 that this downward movement of the plunger G has carried with it a part of the lubricant already within the chamber F, as well as that contained in the lower chamber E, supplied thereto by a previous actuation of the lubricating system as a whole. As soon as the lower edge of the plunger skirting has reached the top edge of the chamber E, that is, the line separating it from the chamber F, the body of lubricant which is carried down is thus cut off from further access from the enlarged chamber F or from escape back thereinto, so that it may be correctly said that the quantity of lubricant thus trapped measures the total quantity which is projected into the bearing at a single actuation of the parts. The strength of the spring D is so calculated as to promptly release the ball C from its position of closure with respect to the passage B' thereof. As soon as the pressure through the pipe K is terminated, the spring D will promptly restore the ball C to closure position. Upon the termination of actuating pressure through the supply pipe K, the resilient strength of the spring H again exerts itself to force the plunger or piston G upwardly until its projection $J_2$ seats against the end J' of the supply passage, but incident to this upward movement of the piston there is an appreciable supply of the lubricant, measured by the capacity of the chamber F which is trapped therein by the closure of further possible communication between the chambers F and N by the rise of the top end of the piston into the latter. Upon a resumption of the pressure through the feed pipe K, the piston G again descends and functions in the manner already described. The annular recess about the piston stem G' in which the top end of the spring H engages constitutes an air pocket or accumulation space Q, from which air can not escape as the piston descends, and into which the trapped air is compressively forced to a degree sufficient to overcome any vacuum tendency toward holding the piston in depressed position when the end of the lubricant-projecting cycle is reached, since the expansion and return toward normal pressure of this trapped body of air really aids the action of the spring in forcing the piston upward.

In the modified form shown in Figure 7, the same operative parts are employed, and they function in the same manner, but in place of the outlet passage B' leading directly into the bearing or other part to be lubricated, it is spaced therefrom by the enclosure of the entire device in a shell or casing R, whose threaded end T is adapted to be screwed thereinto, being provided with a suitable vent V. This makes possible a gravity feed to the bearing of a degree or volume determined by the position of the regulating screw S relatively to the feed passage W, subject to the measured supply of the lubricant through the nipple, as already described.

What I claim is:

1. In combination with a terminally apertured shell provided with an enlarged intermediate portion, a spring-held valve normally closing one of the terminal apertures, a piston member adapted to initially close the chambered intermediate portion of the shell against the access thereinto of fluid entering through the other one of the terminal apertures in the shell, and when moved axially lengthwise to force past said spring-held valve at the other end a specific quantity of previously admitted fluid the further access of lubricant thereinto until the next pressure-induced movement of said piston being cut off by the described descending movement thereof, and a spring adapted to yieldingly hold said piston member in position against the apertured inlet end of the shell.

2. In combination with a shell provided with terminal inlet and outlet apertures and with an enlarged intermediate chamber, a piston member of greater length than the axial extent of said enlarged intermediate portion of the shell adapted to be moved axially lengthwise of said shell and to thereby contemporaneously admit through the inlet aperture and expel through the outlet aperture predetermined quantities of fluid the entering mass of which finds intermediate lodgement within said enlarged chamber meantime and resultantly preventing the access of the newly admitted lubricant into the discharge portion of said shell, a spring for yieldingly holding said piston member in position of closure with respect to the inlet aperture in said shell, and a spring-held valve normally closing the outlet aperture in said shell.

3. In combination with a skirted piston, a terminally apertured shell provided with an intermediate enlarged chamber flanked at either end by portions of just sufficient diameter to permit the movement of said piston the axial extent of said intermediate enlarged chamber being less than the length of said piston, a spring for yieldingly holding said piston in position of closure with respect to the inlet aperture in said shell and for effecting its restoration to such position after its pressure-induced movement lengthwise of the shell has effected the admission of a measured quantity of fluid into said chamber and the expulsion therefrom of a similar and previously admitted quantity of fluid through the outlet aperture, and a spring-held valve for normally closing said outlet aperture.

4. The combination, with a terminally apertured shell provided with an enlarged central chamber flanked by equally diametered piston spaces, of a spring-held valve for normally closing the outlet aperture in said shell, and a spring-engaged piston adapted to normally close the inlet aperture in said shell, and adapted to be projected axially lengthwise thereof by the access of fluid pressure through the inlet aperture, thereby admitting into said chambered portion of the shell a measured quantity of fluid contemporaneously with the ejection through said valve-guarded outlet aperture of a corresponding quantity of previously admitted fluid, and preventing the immediate access of the most recently admitted mass of lubricant to the discharge portion of said shell.

5. In combination with a terminally apertured and centrally chambered shell member adapted for connection at one end with a supply line and at the other end with a part to be lubricated, a valve normally closing the aperture appurtenant the discharge end of said shell member, a piston of greater length than the axially lengthwise extent of the centrally chambered portion of the shell adapted to be moved axially lengthwise of said shell member by the pressure of fluid entering from said supply line, thereby effecting the contemporaneous admission of a predetermined quantity of fluid into said chambered portion of the shell and the ejection of a corresponding quantity of previously admitted fluid through the valve-controlled outlet aperture, and a spring for yieldingly holding said piston in position of closure relatively to the apertured inlet end of the shell.

6. The combination with a shell member having terminal inlet and outlet apertures and an intermediate chambered portion, of a valve for normally closing the outlet apertures, a piston and a spring for normally holding said piston in relation of closure to the inlet aperture, said piston being of such length relatively to that of the intermediate chambered portion of the shell that when actuated lengthwise of the shell by the pressure of fluid entering through the inlet aperture, it is adapted to admit a measured quantity thereof into said chambered portion and to contemporaneously effect the ejection of a similar quantity of fluid admitted at a previous operation through said valve-guarded outlet aperture.

In testimony whereof I sign this specification.

ALBERT M. FARMER.